(12) United States Patent
Walter

(10) Patent No.: US 8,147,363 B2
(45) Date of Patent: Apr. 3, 2012

(54) CONICAL DISK PAIR ASSEMBLY WITH INTEGRATED TORQUE SENSOR

(75) Inventor: Bernhard Walter, Oberkirch-Haslach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 534 days.

(21) Appl. No.: 12/316,667

(22) Filed: Dec. 15, 2008

(65) Prior Publication Data

US 2009/0173592 A1    Jul. 9, 2009

Related U.S. Application Data

(60) Provisional application No. 61/007,469, filed on Dec. 13, 2007.

(51) Int. Cl.
  *F16H 59/00* (2006.01)
(52) U.S. Cl. .......................... 474/18; 474/28
(58) Field of Classification Search .............. 474/8, 12, 474/18, 24, 28
See application file for complete search history.

(56) References Cited

U.S. PATENT DOCUMENTS

| | | | |
|---|---|---|---|
| 6,186,917 B1 * | 2/2001 | Friedmann et al. | 474/18 |
| 6,190,274 B1 * | 2/2001 | Walter | 474/28 |
| 6,241,635 B1 * | 6/2001 | Schmid et al. | 474/11 |
| 6,361,456 B1 * | 3/2002 | Walter | 474/18 |
| 6,361,470 B1 * | 3/2002 | Friedmann et al. | 477/37 |
| 6,506,136 B2 * | 1/2003 | Schmid et al. | 474/18 |
| 2001/0031678 A1 * | 10/2001 | Schmid et al. | 474/18 |

* cited by examiner

*Primary Examiner* — Sang Kim
(74) *Attorney, Agent, or Firm* — Alfred J. Mangels

(57) ABSTRACT

A conical disk assembly including a shaft carrying an axially movable disk and having a fixed disk rigidly connected to the shaft. A support ring having first ramp surfaces facing the axially movable disk is carried on the shaft, and a rotatable sensing piston having second ramp surfaces that face the first ramp surfaces is axially movable along the shaft. Rolling elements are positioned between the ramp surfaces, and when the ramp surfaces are rotated relative to each other, the rolling elements move the sensing piston axially along the shaft. A guide ring is rigidly operatively connected to the axially movable disk and includes guide surfaces associated with the ramp surfaces for radially supporting the rolling elements. The guide ring and the support ring are connected with each other in a non-rotatable and axially movable manner to facilitate assembly of the conical disk assembly.

10 Claims, 2 Drawing Sheets

CONICAL DISK PAIR ASSEMBLY WITH INTEGRATED TORQUE SENSOR

BACKGROUND OF THE INVENTION

1. Field of the Invention

The present invention relates to a conical disk pair assembly having an integrated torque sensor for a belt-driven conical pulley transmission.

2. Description of the Related Art

FIG. 3 shows a longitudinal cross section of a known conical disk pair assembly for a belt-driven conical pulley transmission. As shown in FIG. 3, the conical disk pair assembly includes a shaft 10 to which a fixed disk 12 is rigidly connected. An axially movable disk 16 is located on the shaft 10 and is axially displaceable by means of a splined connection 14, but is nonrotatably connected to the shaft 10. Conical surfaces of the disks 12 and 16 face each other, and between those facing conical surfaces, an endless torque-transmitting means (not shown) circulates. The endless torque-transmitting means connects the illustrated conical disk pair with another conical disk pair (not shown) of the belt-driven conical pulley transmission.

In a radially outer region of the axially movable disk 16 is an annular cylinder 18 that is rigidly affixed on the back side of that disk, on the side facing away from the conical surface. Annular cylinder 18 includes two radially spaced, axially-extending walls that define a U-shaped chamber in cross-section. A guide ring component 20 having a guide surface is rigidly affixed to the radially inner surface of annular cylinder 18.

Spaced axially from the back side of axially movable disk 16 is a support ring component 22 that is rigidly fixed to the shaft 10. Support ring component 22 includes a first axial projection 24 with a free end face having circumferentially-distributed first ramp surfaces 26. Radially outwardly of the first axial projection 24, the support ring component 22 includes a second ring-shaped axial projection 28 that extends between the axially-extending walls of the annular cylinder 18 and is sealed against them by means of seals in such a manner that an adjusting chamber 30 is formed between the free end of second projection 28 and the annular cylinder 18. Hydraulic fluid can be supplied to adjusting chamber 30 by means of radial bores 32 in the axially movable disk 16 and in the shaft 10, and an axial supply channel 34 extending within the shaft and communicating with the radial bore in the shaft.

A substantially annular sensing piston 36 is movably guided on the shaft 10 in an axial direction between the support ring component 22 and the axially movable disk 16. The sensing piston is in the shape of a cup that is open toward the axially movable disk 16 and that ends in a ring 38. On the side of ring 38 that faces away from the axially movable disk 16 are located circumferentially spaced second ramp surfaces 40. Between first ramp surfaces 26 and second ramp surfaces 40 are rolling elements 42, preferably formed as balls, that extend into recesses in the sensing piston 36. The axial position of the rolling elements is primarily determined by the ramp surfaces 26, 40, and their radial position is primarily determined by guide surfaces 43 coordinated with the ramp surfaces and formed by the guide ring component 20, as well as by a radially outer surface of an axial extension of the axially movable disk 16.

Between the sensing piston 36 and the axially movable disk 16, there is a sensing chamber 44 that is connected by means of radial feed bores 46 in the shaft 10 with a supply channel 48 that extends axially within the shaft. Radial discharge bores 50 extend from the sensing chamber 44 and open into a discharge channel 52 that also extends within the shaft.

On the side facing away from the axially movable disk 16, the sensing piston 36 includes axially-extending and circumferentially equally spaced arms 54 that extend through openings in the support ring component 22. Arms 54 include outer axial teeth 56 that engage with inner axial teeth 58 of a drive wheel 60 that is supported on the shaft 10 and that drives the transmission. The sensing piston 36 is therefore non-rotatably circumferentially connected to the drive wheel 60, and is axially movable relative to the drive wheel.

The design and function of the above-described conical disk pair assembly are known and will therefore not be explained in further detail. The rotation of the sensing piston 36 relative to the support ring component 22 changes the axial position of the sensing piston 36, as a result of the corresponding shape of the ramp surfaces 26, 40 and guide surfaces 43, such that when there is a high torque the sensing piston increasingly closes a discharge opening 61 from which the discharge bore 51 extends. Consequently, the hydraulic pressure in the sensing chamber 44 increases, and the axially movable disk 16 is initially urged by a torque-dependent pressure toward the fixed disk 12. The axially movable disk 16 is actually adjusted by modulating the pressure in the adjustment chamber 30.

For the conical disk assembly to function properly, especially the dependence of the pressure in the sensing chamber 44 on the torque acting on the shaft 10, the ramp surfaces 26, 40 and guide surfaces 43 must be precisely positioned in relation to each other. That relationship is ensured when assembling the conical disk assembly by aligning the support ring component 22, having the ramp surfaces 26, in a circumferential direction relative to the guide ring component 20, having the guide surfaces 43. The assembly including the guide ring component 20, annular cylinder 18, and axially movable disk 16 in that relative rotary position is non-rotatably connected to the shaft 10 by means of the splined connection 14, that is, that it is pushed into that relative position onto the shaft 10.

An object of the present invention is to provide a conical disk assembly having an integrated torque sensor that is easier to assemble.

SUMMARY OF THE INVENTION

Briefly stated, in accordance with one aspect of the present invention, a conical disk assembly having an integrated torque sensor for a belt-driven conical pulley transmission includes a shaft with a fixed disk that is rigidly connected to the shaft and that includes a first conical surface. A movable disk having a second conical surface facing the first conical surface is axially movable along the shaft. A support ring component is carried by the shaft on the side of the axially movable disk facing away from the second conical surface and includes first ramp surfaces facing the axially movable disk. A sensing piston is located on the shaft between the support ring component and the axially movable disk and is rotatable relative to and axially movable relative to the shaft. The sensing piston includes second ramp surfaces that face the first ramp surfaces, and a drive torque acting in a circumferential direction can be applied to the sensing piston. A sensing chamber is positioned between the sensing piston and the axially movable disk and can be supplied with hydraulic fluid under pressure through an inlet opening, the sensing chamber having a discharge opening whose effective cross section is changeable as a function of the axial position of the sensing piston. The first and second ramp surfaces are spaced from each other by means of rolling elements, and a relative rotation between the first and second ramp surfaces causes the sensing piston to move axially relative to the shaft. A guide ring component is non-movably connected to the axially movable disk and includes guide surfaces coordinated with the ramp surfaces for radially supporting the rolling elements, wherein the support ring component and the guide ring component are non-rotatably connected with each other and are axially movable relative to each other.

During assembly of the conical disk assembly in accordance with the present invention, the support ring component and the guide ring component can thereby be directly arranged in relation to each other such that the first ramp surfaces provided on the support ring component have the predetermined angular arrangement relative to the guide surfaces on the guide ring component.

At least one of the support ring and guide ring component is advantageously a sheet-metal part that has a form that is provided without cutting metal and that brings about the non-rotatable and axially movable connection.

The support ring component can be rigidly connected to the shaft.

The axially movable disk can be guided on the shaft without effectively engaging in a peripheral direction.

In one embodiment of the conical disk pair in accordance with the present invention, the support ring component is movable circumferentially on the shaft and is axially supported in the direction of an axial movement away from the axially movable disk, and the axially movable disk is axially movable on the shaft and is non-rotatably carried by the shaft.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
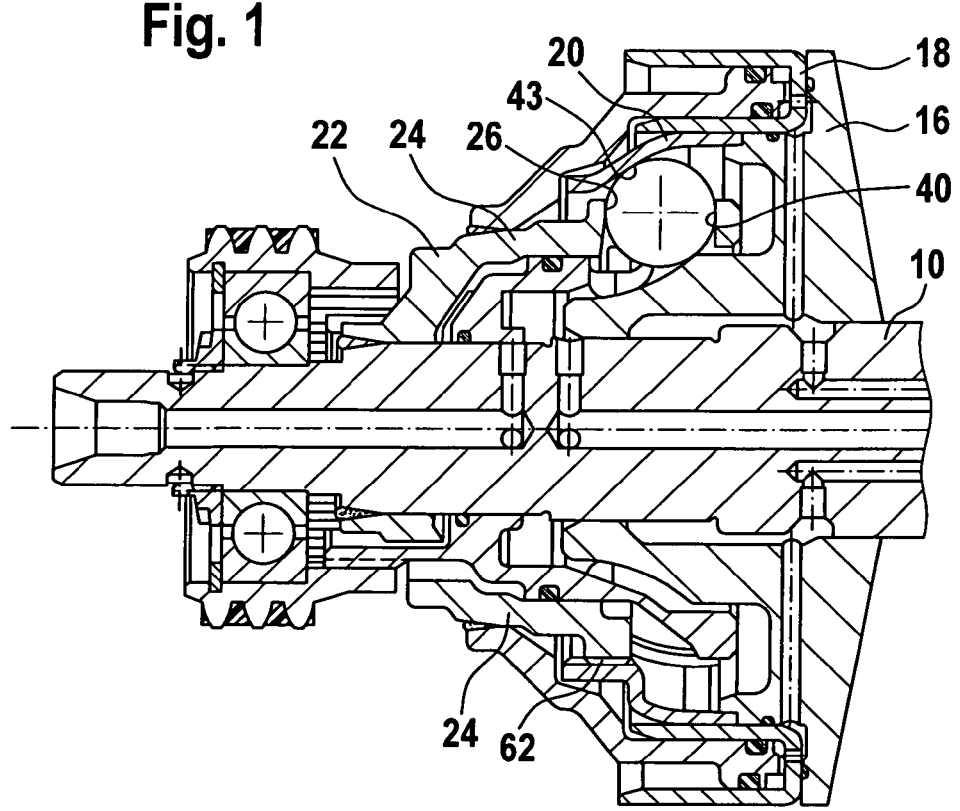
FIG. 1 is a longitudinal cross section of a shaft with an axially movable conical disk in a first embodiment of the present invention.

The embodiments of the invention explained in the following description include many features that correspond to the prior art arrangement shown in FIG. 3. Accordingly, only the differences from the FIG. 3 arrangement that are embodied in the present invention will be explained in the following description, and only the respective reference numerals will be used.

Figure 3:
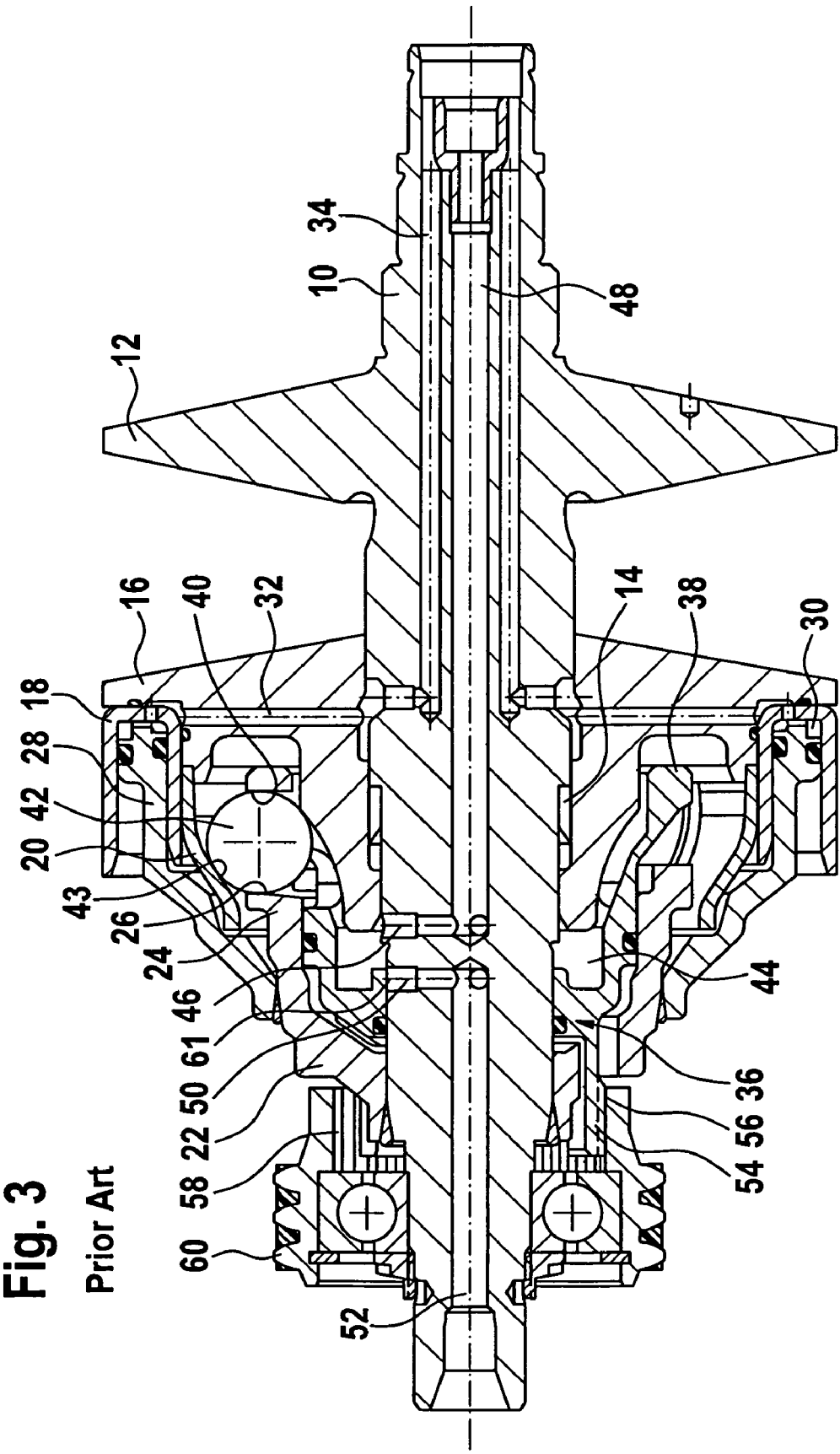
FIG. 3 is a longitudinal cross section of a known conical disk pair assembly.

In the embodiment of the conical disk pair assembly shown in FIG. 1 (the fixed disk 12 of FIG. 3 is not shown), the guide ring component 20 having guide surfaces 43 coordinated with the ramp surfaces 26 and 40, especially the first ramp surfaces 26 of the support ring component 22, is non-rotatably connected by means of splined connection 62 with the support ring component 22, but it is connected in an axially movable manner to the support ring component or to its first axial projection 24. The axially movable disk 60 is not connected to the shaft 10 by means of the splined connection 14 shown in the FIG. 3 arrangement; rather, it is seated on the shaft 10 without circumferentially meshing with it.

In the arrangement in FIG. 1, in which the torque is transmitted from the drive wheel 60 via the splined connection 62 to the axially movable disk 16, the axially movable disk 16 can be pushed directly onto the support ring component 22 together with the guide ring component 20, that is rigidly connected with the axially movable disk, in a predetermined angular relationship so that the predetermined arrangement between the first ramp surfaces 26 and guide surfaces 43 can be directly achieved. By eliminating the direct, non-rotational connection between the axially movable disk 16 and shaft 10, the radially inner region of the axially movable disk 16 can be more freely designed.

Both the guide ring component 20 and the support ring component 22 can be manufactured as sheet metal parts in which the axial grooves that form splined connection 62 are shaped without the cutting operations that are required to provide the non-rotatable and axially movable connection between the guide ring component 20 and support ring component 22.

Figure 2:
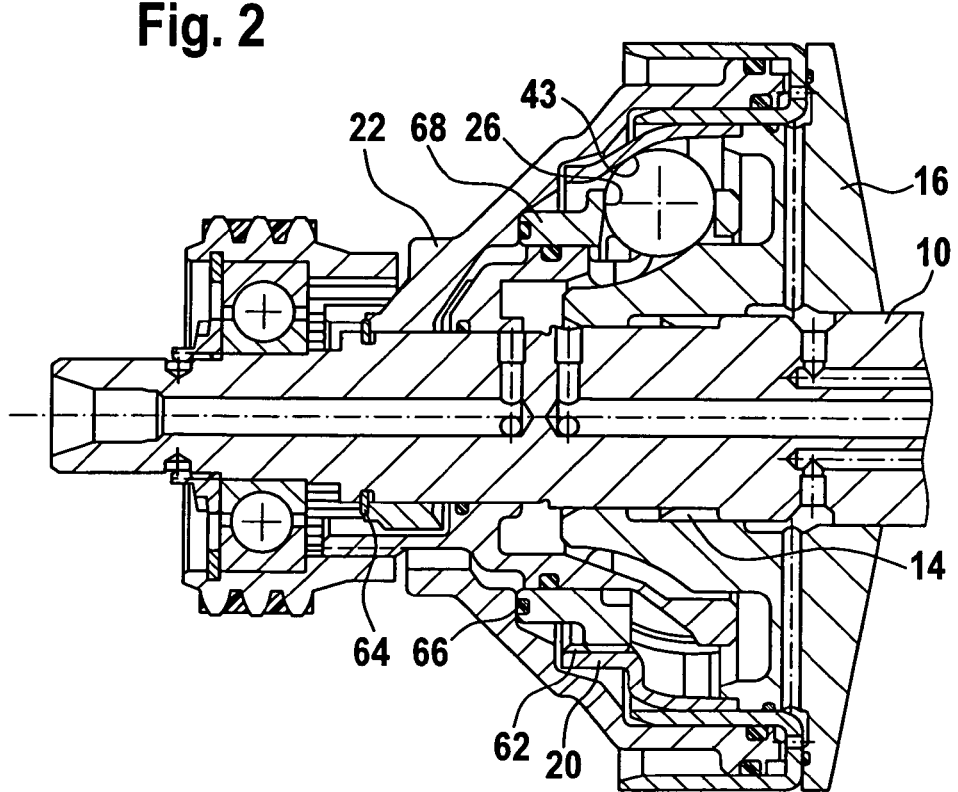
FIG. 2 is a view similar to that of FIG. 1 of a modified embodiment of the present invention.

FIG. 2 shows a variation of the FIG. 1 embodiment. As in the embodiment in FIG. 1, the guide ring component 20 and the first projection 24 of the support ring component 22, which is formed with the first ramp surfaces 26, are connected with each other in a non-rotatable and axially movable manner by means of splined connection 62. In contrast to FIG. 1, however, the support ring component 22 of the FIG. 2 embodiment is not rigidly connected to shaft 10. Instead, it is axially movable on the shaft, wherein the movement of the support ring component 22 away from the axially movable disk 16 is limited by stop 64. The axially movable disk 16 is connected to the shaft 10 in a non-rotatable and axially movable manner by means of splined connection 14 similar to the arrangement shown in FIG. 3.

The embodiment in FIG. 2 allows the design of the support ring component 22 to be simpler in that it does not form a single part with the projection 24 formed with the first ramp surfaces 26. Instead, the first projection is designed as a separate annular component 68 that includes the first ramp surfaces 26 on an end face, and its other end face it abuts the support ring component 22 while being sealed thereagainst by a sealing ring 66. In the embodiment in FIG. 2, the predetermined arrangement between the first ramp surfaces 26 and guide surfaces 43 can be easily achieved during assembly by inserting the annular component 68 in the predetermined angular arrangement into the guide ring component 20. When the support ring component 22 is designed as a single part, the support ring component 22 can be joined with the annular component 68 in the predetermined angular arrangement to the axially movable disk 16, which is designed as a single part with the guide ring component 20.

The design details of the illustrated embodiments of the conical disk pair assembly in accordance with the present invention can be substantially altered. For example, the guide ring component 20 can be directly connected to the axially movable disk 16, or it can be designed so that the guide surfaces provided by the guide ring component 20 are formed directly on the axially movable disk 16. And although particular embodiments of the present invention have been illustrated and described, it will be apparent to those skilled in the art that various other changes and modifications can be made without departing from the spirit of the present invention. It is therefore intended to encompass within the appended claims all such changes and modifications that fall within the scope of the present invention.

What is claimed is:

1. A conical disk pair assembly with an integrated torque sensor for .a belt-driven conical pulley transmission, said assembly comprising: a shaft with a fixed disk having a first conical surface and rigidly connected to the shaft; an axially movable disk carried on the shaft, and having a second conical surface facing the first conical surface; a support ring non-rotatably and axially fixedly supported on the shaft on the side of the axially movable disk facing away from the second conical surface, wherein the support ring includes first ramp surfaces facing the axially movable disk; a rotatable sensing piston axially movable along the shaft and located on the shaft between the support ring and the axially movable disk, the sensing piston having second ramp surfaces facing the first ramp surfaces, and wherein a drive torque acting in a circumferential direction is applied to the sensing piston; and a sensing chamber positioned between the sensing piston and the axially movable disk and supplied with hydraulic fluid under pressure through a hydraulic fluid supply line within the shaft, the supply line within the shaft having a discharge opening at the shaft outer surface whose effective cross section is changeable as a function of the position along the shaft of the sensing piston; wherein the first and second ramp surfaces are spaced from each other by rolling elements, and wherein a relative rotation between the first and second ramp surfaces causes the sensing piston to move axially relative to the shaft; a guide ring rigidly connected to the axially movable disk and having guide surfaces associated with the ramp surfaces for radially supporting the rolling elements; wherein the support ring and the guide ring are non-rotatably connected with each other and the guide ring is axially movable relative to the support ring.

2. The conical disk pair assembly in accordance with claim 1, wherein at least one of the support ring and the guide ring is a sheet-metal part that has a formation produced without cutting metal to provide the non-rotatable and axially movable connection therebetween.

3. The conical disk pair in accordance with claim 1, wherein the support ring is rigidly connected to the shaft.

4. The conical disk pair in accordance with claim 3, wherein the axially movable disk is non-rotatably carried by the shaft.

5. The conical disk pair in accordance with claim 1, wherein the support ring is composed of multiple parts, including an annular component that is separate from a part of the support ring component that is supported on the shaft and that carries the first ramp surfaces.

6. A conical disk pair assembly with an integrated torque sensor for a belt-driven conical pulley transmission, said assembly comprising: a shaft with a fixed disk having a first conical surface and rigidly connected to the shaft; an axially movable disk carried on the shaft and having a second conical surface facing the first conical surface; a support ring supported on the shaft on the side of the axially movable disk facing away from the second conical surface, wherein the Support ring is rotatable relative to the shaft and is supported on the shaft for axial movement; a rotatable sensing piston axially movable along the shaft and located on the shaft between the support ring and the axially movable disk, and an annular component carried by the sensing piston and positioned between the support ring and the axially movable disk, the annular component including first ramp surfaces facing the axially movable disk, the sensing piston having second ramp surfaces facing the first ramp surfaces, and wherein a drive torque acting in a circumferential direction is applied to the sensing piston; a sensing chamber positioned between the sensing piston and the axially movable disk and supplied with hydraulic fluid under pressure through a hydraulic fluid supply line within the shaft, the supply line within the shaft having a discharge opening at the shaft outer surface whose effective cross section is changeable as a function of the position along the shaft of the sensing piston; wherein the first and second ramp surfaces are spaced from each other by rolling elements, and wherein a relative rotation between the first and second ramp surfaces causes the sensing piston to move axially relative to the shaft; a guide ring rigidly connected to the axially movable disk and having guide surfaces associated with the ramp surfaces for radially supporting the rolling elements; and wherein the annular component and the guide ring are non-rotatably connected with each other and are axially movable relative to each other.

7. The-conical diSk pair assembly in accordance with claim 6, wherein at least one of the support ring and the guide ring is a sheet-metal part, and the guide ring has a formation produced without cutting metal to provide the non-rotatable and axially movable connection between the annular component and the guide ring.

8. The conical disk pair in accordance with claim 6, wherein the support ring is axially movably carried by the shaft.

9. The conical disk pair in accordance with claim 8, wherein the axially movable disk is non-rotatably carried by the shaft.

10. The conical disk pair in accordance with claim 6, wherein the support ring is rotatable relative to the shaft and is supported on the shaft for axial movement in a direction away from the axially movable disk, and the axially movable disk is axially movable along and is non-rotatable relative to the shaft.

* * * * *